United States Patent [19]

Schmidt

[11] Patent Number: 5,428,467
[45] Date of Patent: * Jun. 27, 1995

[54] TRANSMISSIVE POLYGONAL OPTICAL SCANNING OF ILLUMINATION FOR LIGHT VALVE VIDEO PROJECTOR

[76] Inventor: Jack H. Schmidt, 1730 Tamarack Ave., Carlsbad, Calif. 92008

[*] Notice: The portion of the term of this patent subsequent to Mar. 14, 2012 has been disclaimed.

[21] Appl. No.: 64,970

[22] Filed: May 20, 1993

[51] Int. Cl.6 .................. G02F 1/1335; H04N 5/645
[52] U.S. Cl. ............................ 359/40; 359/48; 348/781
[58] Field of Search ............... 359/41, 48, 209, 210, 359/211, 40; 353/31, 38; 348/203, 776, 790, 792, 793

[56] References Cited

U.S. PATENT DOCUMENTS

| | | |
|---|---|---|
| 4,176,907 | 12/1979 | Matsumoto et al. ............ 350/6.8 |
| 4,246,612 | 1/1981 | Berry et al. .................... 358/206 |
| 4,538,181 | 8/1985 | Taylor ............................ 358/208 |
| 4,799,164 | 1/1989 | Hellekson et al. .............. 235/467 |
| 5,192,946 | 3/1993 | Thompson et al. ............. 340/794 |
| 5,216,534 | 6/1993 | Boardman et al. ............. 359/209 |

FOREIGN PATENT DOCUMENTS 2277019  11/1990  Japan ........................... 359/209

OTHER PUBLICATIONS

J. H. Waddell, Rotating Prism Design for Continuous Image Compensation Cameras, Jul. 1966, Applied Optics, vol. 5, No. 7, p. 1213.

*Primary Examiner*—Anita Pellman Gross
*Assistant Examiner*—Charles Miller

[57] ABSTRACT

A projection system employs a reflective light valve (10) that is optically addressed by an image from a cathode ray tube (12) and provides an output image for projection by means of a high intensity reading light from a lamp (16) directed to the output face of the liquid crystal light valve. Improved reading illumination is provided by scanning the face of the liquid crystal light valve (10) with a narrow beam of light (80) that moves across the liquid crystal light valve face in synchronism with a scanning image from the writing CRT (12). The scanned narrow band of illumination is provided by refractive transmission through a rotating transparent polygonal body (50,74) having pairs of mutually parallel sides (54,56,58,60,75,76,77a,b), wherein different pairs of sides may be made to transmit light of different colors for color projection. Rotation of the polygonal body is synchronized (82) with the vertical sync (86) of the CRT scan to cause the light beam refracted by the body to synchronously scan the face of the liquid crystal light valve.

16 Claims, 2 Drawing Sheets

TRANSMISSIVE POLYGONAL OPTICAL SCANNING OF ILLUMINATION FOR LIGHT VALVE VIDEO PROJECTOR

This application is related to a application of Alan R. Henderson and Richard M. Filia Ser. No. 08/064,842, filed May 20, 1993 for Scanned Illumination for Light Valve Video Projectors, filed on even date herewith. The disclosure of this application of Henderson and Filia is incorporated herein by this reference as though fully set forth.

BACKGROUND OF THE INVENTION

1. Field of the Invention

The present invention relates to reflective liquid crystal light valve projection systems and more particularly concerns improved reading light for such a system.

2. Description of Related Art

The reflective liquid crystal light valve (LCLV) is a thin film, multi-layer structure comprising a liquid crystal layer, a dielectric mirror, a light blocking layer and a photosensitive layer, all sandwiched between two transparent electrodes. In a reflective liquid crystal light valve projection system a polarized illumination (reading) beam is directed through the liquid crystal layer to the dielectric mirror which reflects it back through the liquid crystal layer. In an optically addressed system an input image of relatively low intensity writing light, such as that generated by a cathode ray tube, is applied through one of the electrodes to the photosensitive layer. Impedance of the photosensitive layer is lowered in proportion to intensity of incident writing light, resulting in a spatially varying impedance pattern. This causes a corresponding increase in voltage dropped across the liquid crystal layer in a spatially varying pattern matching the incident writing image. Tilt of the liquid crystal molecules in a particular region, and therefore the birefringence seen by the high intensity reading light passing through the region, is directly dependent on voltage dropped across the liquid crystal layer. To read the birefringence pattern, a fixed beam of linearly polarized illumination (reading) light from a high power light source floods the output face of the liquid crystal layer, passes through the liquid crystal layer and is reflected from the dielectric mirror to be polarization modulated in accordance with the input (writing) light information incident on the photosensitive layer. Therefore, if a complex distribution of light, for example a high resolution input image from the cathode ray tube, is focused on the photosensitive surface, the device converts the relatively low intensity input image into a high intensity replica image which can be reflected for projection with magnification to produce a high brightness image on a large viewing screen.

Projection systems of this type are described in several U.S. Patents, including U.S. Pat. Nos. 4,650,296 to Koda et al for Liquid Crystal Light Valve Color Projector, 4,343,535 to Bleha, Jr. for Liquid Crystal Light Valve, 4,127,322 to Jacobsen, et al for High Brightness Full Color Image Light Valve Projection System, and 4,191,456 to Hong, et al for Optical Block for High Brightness Full Color Video Projection System.

In the liquid crystal light valve projection system a significant amount of power is used by the high intensity reading light source. In the prior art, the light source provides a fixed area reading illumination that covers the entire area of liquid crystal. This high intensity reading light is not employed with optimum efficiency nor optimum contrast. In prior systems the incoming reading light beam frequently has a circular area, whereas the active area of the liquid crystal light valve usually has a rectangular configuration with an aspect ratio, for example, in the order of 16:9 in some systems. Therefore significant parts of the reading light are wasted because they fall on inactive areas. Further, in an optically addressed liquid crystal light valve the writing light input is provided, line by line, in a rectangular raster scan (by a standard CRT scan). Accordingly, a major amount of reading illumination continues to impinge upon various areas of the liquid crystal after a line of information of the raster scan has been written. The effect of the optically written input information, which is written line by line in the conventional raster scan, decreases with time after the individual line is energized. Consequently, continued application of high power, high intensity reading light decreases in efficiency with time following the writing of the input information. In many projectors, maximum allowable light input intensity is limited by allowable light valve temperatures so that the overall output intensity of the projected image may be limited unnecessarily by inefficient use of the high intensity reading light.

The above-identified related application of Alan R. Henderson and Richard M. Filia solves a number of these problems by providing a high intensity reading light that illuminates only part of the active area of the liquid crystal. In effect, a narrow beam of high intensity reading light is caused to scan the active face of the liquid crystal in synchronism with the input writing scan. The scanning of the reading light is provided in the application of Henderson and Filia by a train of quasi-cylindrical light bending or light reflecting elements that are sequentially interposed between the high intensity reading light source and the liquid crystal. The quasi-cylindrical light bending elements are mounted on a circular wheel and themselves have a circular shape. The wheel is rotated to sequentially interpose the successive bending elements between the light source and the liquid crystal to cause a narrow elongated band of light to scan in synchronism with the input scan.

Because of the curvature of the quasi-cylindrical elements of the related application, some degree of undesirable lateral scan, orthogonal to the direction of the intended scan, is provided. Because the apparatus of the related application scans by employing an angularly deflected beam, telecentric behavior of the beam is lost. Telecentric behavior is desirable wherever it is important for the beam as a whole to be perpendicular to an object or image plane, such as in a liquid crystal projection system. Further, it is desirable to enable the apparatus to be packaged in a smaller space, to further reduce any chromatic aberration, and to eliminate vertical retrace time as the scanning shifts from one element to another in the train of quasi-cylindrical elements of the Henderson and Filia apparatus.

Accordingly, it is an object of the present invention to provide scanning illumination for an optically addressed liquid crystal light valve video projector that improves upon the arrangement described in the Henderson and Filia application.

SUMMARY OF THE INVENTION

In carrying out principles of the present invention in accordance with a preferred embodiment thereof, an improved method for illuminating a liquid crystal light valve active area is provided for a liquid crystal light valve that is optically addressed by an input write beam that scans the liquid crystal light valve in a writing scan and wherein the liquid crystal light valve has an active area that is illuminated with a high intensity reading light. The reading light is projected from a source toward the liquid crystal light valve through a transparent polygon having an even number of sides. Angularly shifting the transparent polygon causes light from the light source passing through the polygon to be displaced repetitively in such passage. More specifically, a four or six sided transparent polygon, or a polygon having other even numbers of sides, is mounted for rotation about an axis parallel to its sides and perpendicular to the direction of transmission of the reading light toward the liquid crystal light valve. The reading light is shaped into a relatively narrow beam that illuminates only a small portion of the active area of the liquid crystal light valve at any given time and, by rotation of the polygon, is caused to scan the active area in synchronism with the input writing scan.

For color projection, the input writing signal may be derived from a cathode ray tube providing sequential scans of red, blue and green color components in sequence. For such an input the transparent polygon has pairs of sides, numbering three or integral multiples of three, and the sides of each pair are treated to pass light of uniquely different spectral content so as to cause the LCLV system to project repetitive sequences of red, green and blue images.

DESCRIPTION OF THE PREFERRED EMBODIMENT

Figure 1:
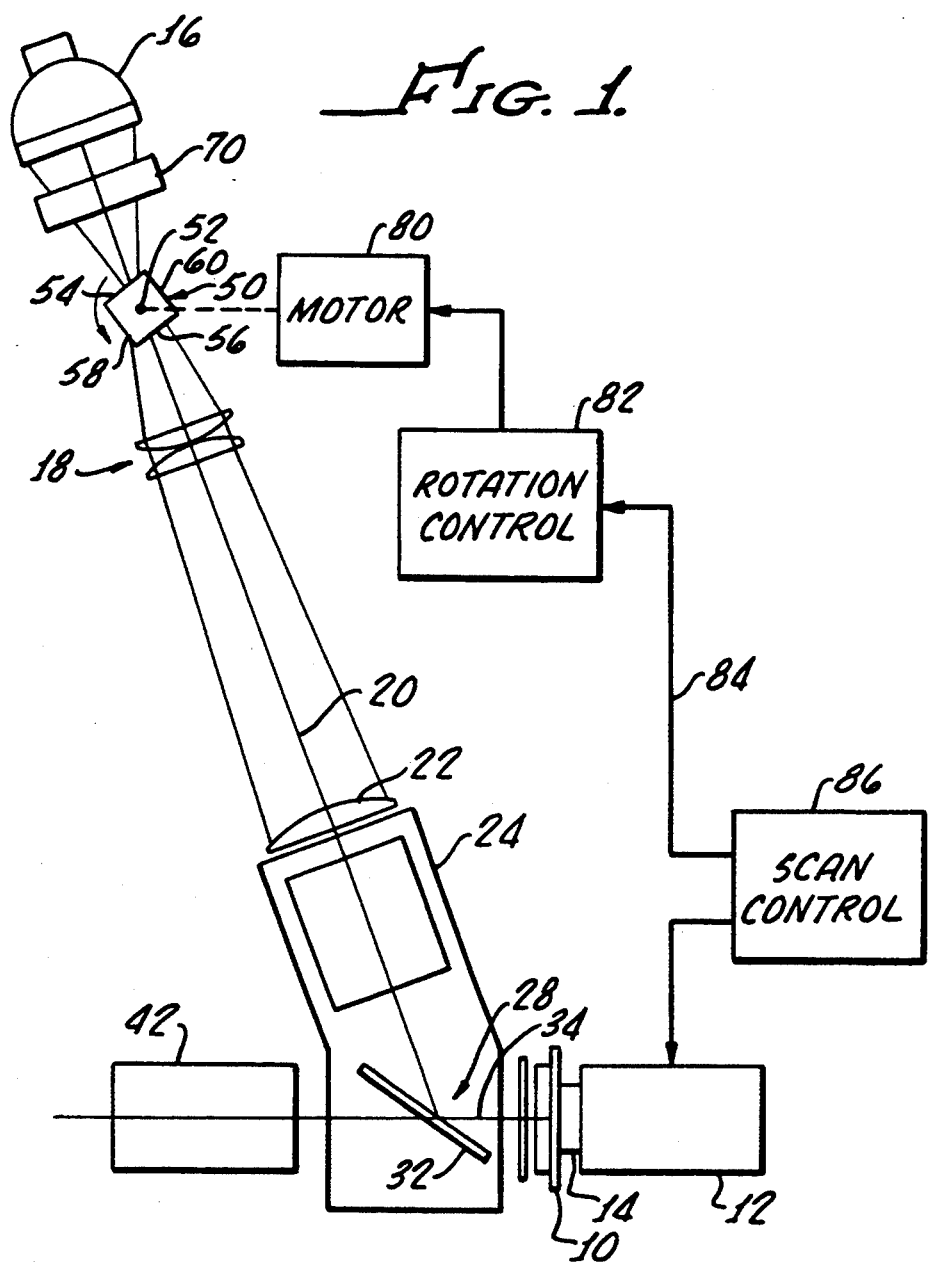
FIG. 1 illustrates basic components of an optically addressed liquid crystal light valve projector having improved reading illumination according to a preferred embodiment of the present invention.

Schematically illustrated in FIG. 1 are components of a known optically addressed liquid crystal light valve projector which is modified to incorporate scanned illumination of reading light according to one embodiment of the present invention. The projector first will be described as it would be without the components of the present invention. A liquid crystal light valve module 10 is optically addressed by input writing light in the form of an image provided from a cathode ray tube 12 via a fused fiber optic face plate 14. A high intensity xenon arc lamp 16 provides reading light which is transmitted via a lens 18 along a path 20 and, via a second lens 22, through an ultraviolet filter and pre-polarizer filter 24. Light from filter 24 is transmitted to an input window of a light polarizing prism (polarization analyzer) 28 having a reflecting/transmitting polarization mirror, such as a MacNeille prism 32. Projector components of the present invention, including elements 50, 52, 54, 56, 58, 60, 70, 80 and 82, are temporarily ignored in this initial discussion of projector operation.

Polarized light from pre-polarizer filter 24 strikes the MacNeille prism 32, which transmits light of one polarization state and reflects light of a second polarization state. Light reflected from prism 32 travels along a path 34 to the output face of the liquid crystal module 10. This is the reading light that is reflected from the liquid crystal module. Intensity of the reflected reading light varies spatially over the face of the liquid crystal in accordance with spatial variations of intensity of the optical image that is applied as a writing input from the cathode ray tube and its fused fiber optic face plate 14. Briefly, those areas of the liquid crystal light valve that receive light from the cathode ray tube reflect the high intensity reading light with a polarization that allows the reflected light to be transmitted through the MacNeille prism and through an output window of the prism to a projection lens 42 for projection on a suitable screen (not shown). Areas of the liquid crystal that are dark, e.g. those that receive no input light from the cathode ray tube, reflect light with unchanged polarization state, which accordingly cannot pass through the MacNeille prism 32. This light of unchanged polarization is reflected by the prism 32 out of the system. Consequently, a high intensity image of the low intensity input light from the cathode ray tube is reflected from the liquid crystal to the projection lens for projection.

In the past, the reading light provided from the arc lamp and pre-polarizer filter has had a fixed area, steady state beam that illuminates the entire face (and more) of the liquid crystal module. The latter has an active area that may be of various dimensions, and in some typical embodiments may be of a circular configuration of approximately two inches in diameter or less, or may have a rectangular configuration of one and one-half inches in vertical dimension by two inches in width, giving about a two and one-half inch diagonal on the rectangle. The reflected reading light is of sufficient intensity to allow a good clear image of this relatively small area display to be expanded and projected on a screen in dimensions of as much as fifteen by twenty feet, for example.

As previously mentioned, this type of prior art fixed position illumination has a number of problems which in general limit operation of the liquid crystal light valve projector and decrease its efficiency. Much of the fixed area light falls outside of the active area of the liquid crystal and thus is totally wasted. For example, assuming a uniform illumination density and a 3:4 aspect ratio of a normal television set and of many computer displays, 38.4% of a fixed circular uniform light having a diametral dimension equal to or slightly larger than the active area diagonal falls outside of the active raster scan so that nearly 40% of the input reading light is lost. Moreover, in many optically addressed liquid crystal light valve projection systems the input light is provided from the cathode ray tube in a conventional line by line rectangular raster scan, such as produced by a conventional television set. In such a conventional scan the horizontal scan velocity is very high, but vertical scan velocity provides but sixty fields a second. The conventional scan effectively moves vertically down the screen in a line by line scan. Accordingly, the fixed illumination by reading light of the prior art liquid crystal light valve projector illuminates areas of the light valve raster scan both before and after a particular line has been written. After each scan line is written, the activated screen area decays in intensity from the intensity of its freshly written condition. Since the output of the liquid crystal light valve depends in part upon the intensity of the input or writing illumination, the fixed reading illumination of the prior art will cause perceived brightness and contrast to be reduced by a factor of more than two for fast light valves when used with real time video.

In the related application of Henderson and Filia the illumination beam transmitted along path 20 is shaped into a narrow band of light by a pair of beam shaping lenses. The shaped beam illuminates only a small part of the active area of the LCLV. This band is caused to scan the active face of the liquid crystal light valve in a vertical scan that is synchronized with the input writing scan of the cathode ray tube 12. The illumination scanning mechanism of the related application comprises a rotatably mounted wheel having a number of transparent lens elements secured to its outer periphery and extending around the periphery of the wheel in a narrow concentric band, with each element forming a quasi-cylindrical lens, for a refractive arrangement, or a curved reflective surface, for the reflective arrangement. The arrangements of the related application thus provide an input illumination beam that is angularly refracted or reflected to illuminate the entire active area of the liquid crystal light valve by a smaller area, narrow scanning beam.

POLYGONAL SCANNER

According to principles of the present invention, the rotating wheel of the related application is replaced by a transparent polygonal body 50 (FIG. 1) mounted for rotation about an axis 52 and driven in a continuous unidirectional rotation by a motor 80. Rotation axis 52 intersects and is perpendicular to the axis of the light beam emanating from lamp 16. It is also parallel to the sides of body 50. The rotating body is positioned between the arc lamp 16 and the lens 18 that transmits light from the lamp to the lens 22 at the input of filter 24. The body 50 has a cross section, in a plane perpendicular to its axis of rotation, that is polygonal, with an even number of planar sides. A four sided or cubical body is illustrated. Other even numbers of sides may be used. Pairs of sides, such as sides 54,56 of a first pair, are mutually parallel to one another. Sides of the second pair of sides, 58,60, are also parallel to one another and both are perpendicular to the sides 54,56. All sides of the polygonal body lie in planes parallel to the rotation axis 52.

Light passing through the polygonal body 50 is twice refracted, to be displaced to an output path that is parallel to the input path. This displacement varies in magnitude as the body 50 rotates to effect a scanning motion of the light transmitted by the body.

Figure 2A:
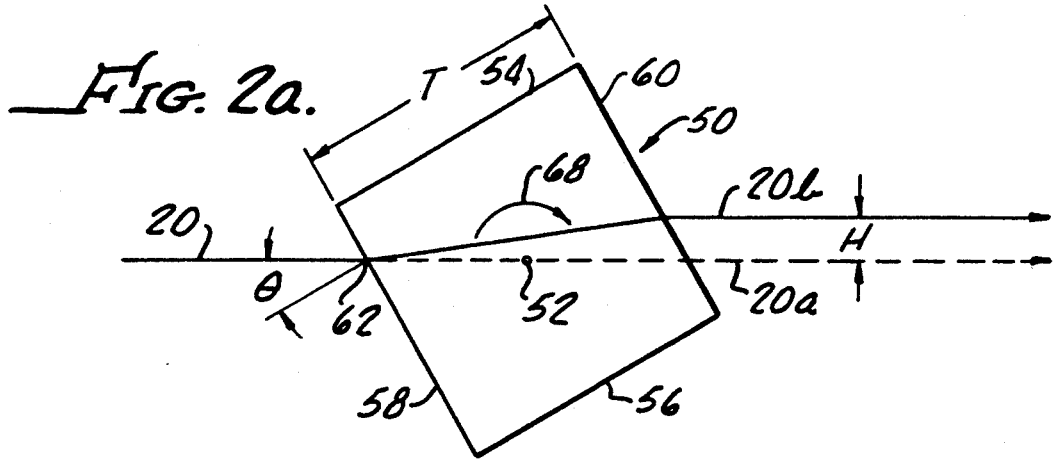
FIGS. 2A, 2B and 2C illustrate the action of a rotatable polygonal body in displacing incoming illumination or reading light.
Figure 2B:
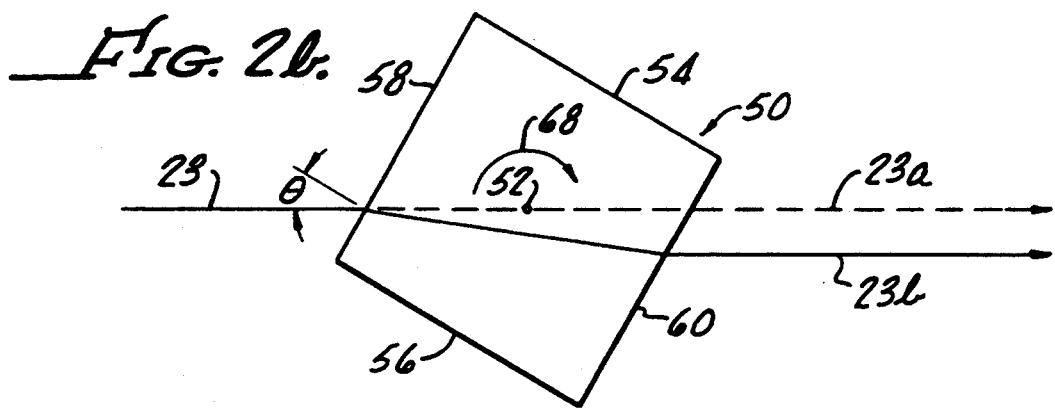
Figure 2C:
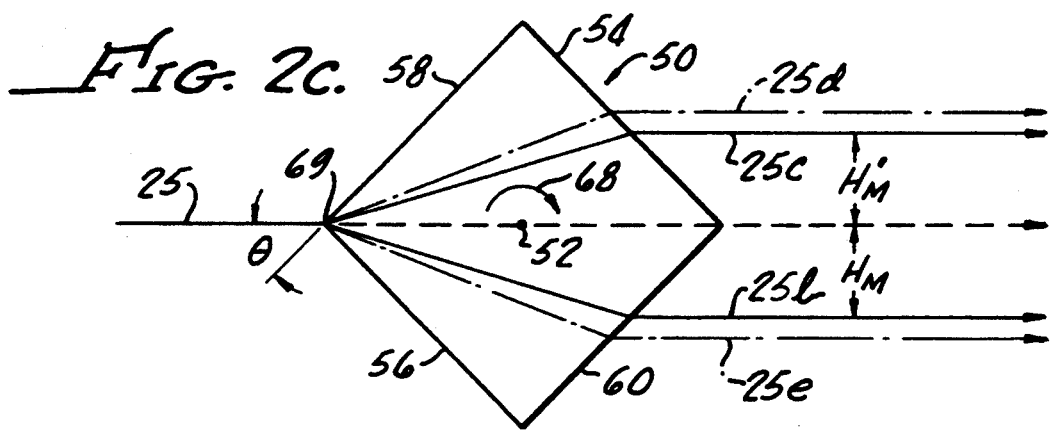

FIGS. 2a, 2b and 2c illustrate the parallel displacement of the reading light beam by the rotating polygonal body 50. As depicted in FIG. 2a, an incident light beam directed toward transparent polygon 50 along path 20 is incident upon surface 58 at a point 62, and, if not refracted, would tend to continue along the same path 20a to the prepolarizer filter 24 and reflecting transmitting polarization mirror 32. However, because of the passage of the beam through the transparent cube, it is refracted upon entering the cube, and is again refracted as it exits the cube along a path 20b that is parallel to the original path 20a (because the sides 58 and 60 are mutually parallel). The output path 20b is displaced from the aligned paths 20 and 20a by a height indicated as H in the drawing. Assuming the polygon has a thickness T (between faces 58,60), and assuming that the light path 20 is incident upon cube surface 58 at an angle $\Theta$ (between the incoming light path and a perpendicular to the surface), the spatial displacement or vertical height H is proportional to the polygon thickness T and the rotational angle about axis 52. This displacement is defined by the equation:

$$H = (T)\sin\Theta \left(1 - \frac{\cos\Theta}{(n^2 - \sin^2\Theta)^{\frac{1}{2}}}\right)$$

Where n is the index of refraction of the body 50.

This equation and geometry upon which it is based is described in pages 286 through 291 of the text *Optical System Design* by Rudolph Kingslake, published 1983 by the Academic Press. These pages of the text describe the use of thick glass plates and other rotating systems for high speed cameras. The suggested use in the Kingslake text is in an imaging system for a camera, wherein certain types of aberration (translational) introduced will impart significantly adverse effects to the image. Partly for this reason such rotating systems have not been used.

However, translational aberration that may be introduced by the rotating polygon and which produces undesirable effects in the imaging system of a camera is of little concern where the rotating light displacing polygon is used merely for illumination of the active face of a liquid crystal light valve but is not required to form any images. As used in the present system, the aberration of the rotating polygon causes no adverse effects.

Further, the transmissive polygon scanner, having pairs of mutually parallel, flat, opposite faces through which the light beam is transmitted, has very little chromatic aberration. This is true because any angular aberration (prismatic dispersion) of the first surface is effectively cancelled by the equivalent aberration of the second surface.

Assuming the body 50 of FIG. 2a is rotating in a clockwise direction, as indicated by arrow 68 of FIG. 2a, continued rotation will bring the body to a position in which the input face 58 now has an incident angle $\Theta$ of opposite sense as compared to the input angle $\Theta$ shown in FIG. 2a. Thus, with input light transmitted along a path 23 in FIG. 2b and tending to continue (in the absence of the presence of the body 50) along the path 23a, indicated by dotted line, the beam is actually displaced downwardly to exit along a path 23b of FIG. 2b. Path 23b is displaced downwardly from the path 23, but, nevertheless, is still parallel to the incoming beam path. Continued rotation of the body causes the beam displacement to follow a repetitive vertically reciprocating path that would exhibit a sawtooth shape if beam displacement is plotted against rotation angle. With the beam incident along a path 25, as illustrated in FIG. 2c, at an input angle $\Theta$ of 45°, the beam impinges upon the body at the edge 69. As it does so, the maximum downward displacement $H_m$ is produced to provide a beam having an output path along path 25b, that is parallel to the input path 25. As the body rotates, and with the input angle of incidence at 45°, the beam next impinges upon the adjoining surface 56 of the body, providing a maximum upward displacement $H'_m$, with the output beam being directed along path 25c. As the body corner comes around, there is an instantaneous upward shift of the beam from its lowermost output path 25b to its uppermost path 25c so that the beam shifts instantaneously between its positions of extreme displacement. Continued clockwise rotation from the position shown in FIG. 2C causes the beam to be displaced downwardly from output beam path 25b in a substantially linear fashion (except as will be described below) through a zero displacement position to the maximum or lowermost field position indicated by path 25b, at which point the beam again shifts instantaneously to its uppermost position. Accordingly, a repetitive scan is provided.

FIG. 2c shows displacement paths 25b,25c for an ideal scanner (e.g. a polygon in which displacement is directly proportional to rotation angle). The ideal scanner would provide a vertical displacement (as viewed in FIG. 2c) having a magnitude that is a linear function of the polygon rotation angle Θ. However, due to Snell's law, the maximum refractive displacement for a cubical body is 20% larger than an ideal displacement that is linearly related to the rotation angle. Accordingly, if one considers the maximum limiting top edge 25c and bottom edge 25b of the scan positions shown in FIG. 2C to be displacements achieved by an ideal scanner, having a thickness T, the actual top of field and bottom of field output paths would be as illustrated along dotted paths 25d for the upper edge of the field and 25e for the lower edge of the field. These dotted paths illustrate the increased actual displacement that is due to Snell's law. This nonlinearity is accommodated simply by decreasing the actual thickness T from that of the ideal scanner, where T is determined from an ideal maximum displacement H according to the equation set forth above so as to provide the actual top and bottom field edges along paths 25c and 25b. Accordingly, decreasing thickness of the body will yield actual maximum displacements of $H'_m$ and $H_m$, with the output beam along the desired paths 25c and 25b. Thus, effects of the nonlinearity of beam translation with respect to angular position of the polygon are minimized by making the thickness of the polygon (e.g. the distance between any pair of parallel sides) less than the thickness that would provide displacement of the beam by the actual maximum magnitude $H_m$ when the beam is transmitted through an ideal polygon. In this manner nonlinearity may be reduced to a little as 4%, and to even smaller amounts for transparent beam displacing polygons having more than two pairs of parallel faces. It may be noted that this nonlinearity exists in a vertical direction, in the orientation shown in FIG. 2C, that is, in a direction that is perpendicular to both the axis of rotation 52 and to the incoming light path 25.

Figure 3:
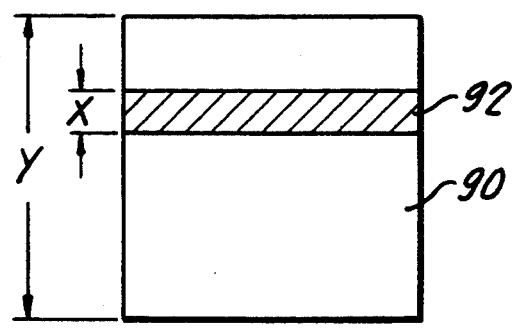
FIG. 3 illustrates a narrow band of illumination light that scans the active area of the LCLV.

The relatively large area illumination beam from the arc lamp is shaped by beam shaping lenses 70 (FIG. 1) interposed between the lamp and the body 50. This provides a relatively narrow (in the direction of the scan) beam, at the liquid crystal, that illuminates only a relatively small portion of the active area of the liquid crystal light valve at any one time. Thus, as shown in FIG. 3, the reading beam that impinges on the active face 90 of the liquid crystal light valve is shaped to provide a narrow band 92 of reading light having a vertical height that is only a small fraction of the vertical height Y of the full active area 90 of the face of the liquid crystal light valve. To provide this beam shaping the lens group 70, that provides the input to the rotating body 50, includes a negative cylindrical lens interposed in the light path between the rotating polygon 50 and arc lamp. This negative cylindrical lens has little effect upon the light beam in the vertical or scan direction, but in the horizontal or orthogonal direction it causes the beam to diverge. The lens group 70 also includes a planoconvex lens that collimates the divergent axis of the beam and causes the beam in its scanning direction (the vertical direction) to converge more rapidly to a line or narrow band at the active area of the output face of the light valve. Beam shaping arrangements of the present invention are the same as those described in further detail in the related application of Henderson and Filia.

Temporal brightness variations can be substantially minimized by placing the polygon scanner body 50 close to an intermediate image that is provided in the system optics so that the edge of the polygon is very close to or may actually touch the intermediate image. System optics provide one or more intermediate images, one of which is positioned near the input side of the rotating body (e.g. between the body and the beam shaping lens group 70). If the body is further away from this intermediate image, illumination from one image point will fall in both sides of a corner of the polygon. Illumination near the bottom of the field will fade away and grow brighter near the top, and thus there would be some degree of decreased illumination introduced because of the distance from the polygon corner to the intermediate image. If this distance is minimized, all of the light from an intermediate image point will impinge upon one face of the body 50 and all will follow one path. If this distance is greater, light from an intermediate image point is effectively split at the corner of the body 50 to follow upper and lower paths in both of which the light is of decreased intensity. Accordingly, it is desirable to minimize distance between the body 50 and an adjacent intermediate image.

As mentioned above, vertical re-trace time for the described arrangement is zero. Light falling off the bottom of the light valve active area is instantaneously directed to the top of the light valve active area. If a non-zero trace time is required, the scan extent may be increased (by increasing the thickness of the polygon scanner, e.g. increasing the distance between a pair of parallel faces). With such increased thickness the upper and lower edges of the scan extend beyond the desired illumination area, thereby creating a finite re-trace time, although with some loss of illumination.

It will be understood that the horizontal width of the polygon scanner, that is, the dimension of the scanning body 50 in a direction parallel to its rotational axis, must be large enough to contain the horizontal width of the light and the full desired divergence of the beam that is accomplished by the negative cylindrical lens.

Figure 4:
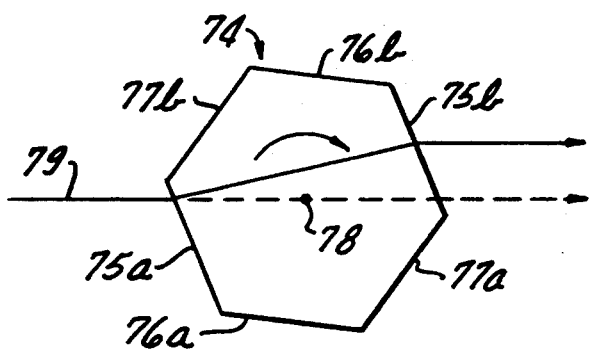
FIG. 4 illustrates a six sided transparent light displaying cube that may be employed for a color projection system.

In one implementation of a color projection system the cathode ray tube 12 has an input that is derived from successively different ones of three primary colors red, green and blue. Thus, the cathode ray tube has a sequential color scan, scanning first red, then blue then green in sequence and may employ 180 fields per second. The red, blue and green fields can be non-interlaced or interlaced individually with another set of respective red, green and blue fields to provide a single frame. Where such an input is provided to the cathode ray tube and a color projection system is desired, the polygon scanner body 50 is formed with at least three pairs of flat parallel sides or a number of pairs that is an integral multiple of three. Thus, as illustrated in FIG. 4, a polygon scanner 74, for a color projector system, has three pairs of flat parallel faces 75a,75b, 76a,76b, and 77a,77b and is mounted for rotation about an axis 78 perpendicular to the incoming light path 79 and parallel to the scanner faces. Suitable color selective coatings, such as dichroic coatings that allow the individual faces of a given pair to pass light of a unique spectral content, are applied to the several polygon faces. Thus the faces 75a,75b of one pair are coated to transmit only red and reject or reflect other colors. A next pair in sequence (of the sequence of faces that are presented to the incoming light beam as the polygon scanner body rotates), such as faces 76a,76b, are coated to transmit only light of green spectral content and to reflect light of other spectral content. Similarly the faces 77a and 77b of the third pair are coated to transmit solely blue light and to reflect all others. With such an arrangement the reading light, which has a full spectrum of wavelengths, impinges upon the active area of the liquid crystal light valve and changes in color from field to field in sequence, with the three color sequence repeating for each rotation of the scanning body (or, if there are more than three pairs of faces, the repetition will occur several times per rotation).

If deemed necessary or desirable, a desired optical power can be provided at each of the polygon surfaces by curving the otherwise flat surfaces. Curving the surfaces will degrade the ability of the system to preserve its telecentric properties, so that advantages of the one feature must be balanced against advantages of the other feature in a particular application.

As described in further detail in the related application of Henderson and Filia, motor 80 that rotates body 50 is operated under control of a rotation control circuit 82 that receives synchronizing signals on line 84 from a cathode ray tube scan control circuit 86. The latter provides horizontal and vertical scan control signals to control the rectangular raster of the cathode ray tube.

It will be seen that there has been described a transmissive polygonal scanning body that provides a repetitive scanning translation of a shaped illumination beam for an optically addressed liquid crystal light valve projector to thereby greatly enhance illumination efficiency and uniformity in a compact arrangement that preserves the telecentric nature of the incident beam.

What is claimed is:

1. In a liquid crystal light valve projection system wherein a liquid crystal light valve is optically addressed by an input write beam that scans said liquid crystal light valve in a writing scan and wherein high intensity reading light illuminates an active area of said liquid crystal light valve to be reflected for display, an improved method for illuminating said liquid crystal light valve active area comprising:
providing a high intensity light source,
transmitting reading light from said source toward said liquid crystal light valve,
mounting a transparent polygon between said light source and said liquid crystal light valve, and
repetitively angularly shifting said transparent polygon to cause light from said light source to pass through said polygon and to be displaced repetitively by such passage.

2. The method of claim 1 wherein said polygon comprises a body having pairs of mutually parallel sides, and wherein said step of angularly shifting said body comprises rotating said body about an axis parallel to said sides and perpendicular to the direction of transmission of said reading light toward said liquid crystal light valve.

3. The method of claim 1 including the step of shaping said reading light transmitted toward said liquid crystal light valve into an illumination beam having an area smaller than said active area.

4. The method of claim 1 wherein said writing scan moves over said liquid crystal light valve in a first direction and including the step of shaping said reading light projected toward said liquid crystal light valve into an illumination beam having a dimension in said direction that is less than the dimension of said active area in said direction, said step of angularly shifting said polygon including the step of scanning said illumination beam in said direction.

5. The method of claim 1 wherein said polygon comprises a body having at least three pairs of mutually parallel sides, and wherein said step of angularly shifting said polygon comprises rotating said polygon about an axis parallel to said sides.

6. The method of claim 5 including the step of coating different ones of said pairs of sides with different color selective coatings.

7. The method of claim 5 including the step of selectively passing monochromatic light of different colors through respective pairs of said polygon sides.

8. The method of claim 5 including the step of treating the sides of one of said pairs of sides to pass light of a first spectral content, and treating the sides of at least a second pair to pass light of a second spectral content different than said first spectral content.

9. The method of claim 5 including the step of treating the sides of a first pair of said sides to transmit light of a first color and reflect light of second and third colors, treating the sides of a second pair of said sides to transmit light of said second color and reflect light of said first and third colors, and treating the sides of a third pair of said sides to transmit light of said third color and to reflect light of said first and second colors.

10. The method of claim 1 wherein said step of mounting a transparent polygon comprises the step of forming said polygon with at least first and second pairs of sides that are substantially parallel to one another, whereby light passing through said polygon is displaced by a maximum distance from a reference for a given angular position of said polygon, said polygon having a thickness between sides of a pair that is less than the thickness that would provide displacement of said maximum distance by passing light through an ideal polygon in which displacement is proportional to angular position.

11. The method of claim 2 including the step of synchronizing rotation of said body with said writing scan.

12. The method of claim 1 wherein said step of transmitting reading light comprises shaping the reading light to a narrow band and causing said polygon to repetitively displace said band parallel to itself in synchronism with said writing scan.

13. A liquid crystal light valve projector comprising:
a liquid crystal light valve having an input face and an output face with an active area,
means for optically addressing the liquid crystal light valve by an input light beam that scans said input face in a writing scan, and
high intensity reading light means for illuminating said output face to provide a reflected image for display, said high intensity reading light means comprising:

high intensity light source means for generating a high intensity illumination beam, means for shaping said illumination beam into a reading beam having a reading area smaller than said active area of said output face, a transparent light displacing body comprising a polygonal body positioned between said light source means and said output face, means for mounting said body for rotation about an axis perpendicular to said high intensity illumination beam, whereby said high intensity illumination beam is transmitted through said body to said output face and is variably translated parallel to itself as said body rotates, and means for rotating said body about said axis in synchronism with said writing scan.

14. The projector of claim 13 wherein said means for shaping comprises means for shaping said illumination beam into a narrow band of reading light.

15. The projector of claim 13 wherein said polygonal body has at least three pairs of mutually parallel sides and in which the sides of each pair have color selective coatings, the coatings of sides of any one pair being the same as one another, and the coatings of each pair being different than the coatings of the other pairs, whereby light of different colors is transmitted through different pairs of sides as said body rotates.

16. The projector of claim 13 wherein the magnitude of translation of the illumination beam is a nonlinear function of the angle of rotation of said polygonal body and has a maximum magnitude as said body rotates, and wherein said polygonal body has a thickness that is less than the thickness that would provide translation of said illumination beam by said maximum magnitude if the beam were transmitted through an ideal body in which beam translation is a linear function of angle of rotation.

* * * * *

UNITED STATES PATENT AND TRADEMARK OFFICE
CERTIFICATE OF CORRECTION

PATENT NO. : 5,428,467
DATED : Jun. 27, 1995
INVENTOR(S) : Jack H. Schmidt

It is certified that error appears in the above-indentified patent and that said Letters Patent is hereby corrected as shown below:

Title page, item [73] :

Under Assignee: should be --Hughes-JVC Technology Corporation, Carlsbad, California--

Signed and Sealed this

Fifth Day of November, 1996

Attest:

BRUCE LEHMAN

Attesting Officer     Commissioner of Patents and Trademarks